United States Patent [19]

Goodwin et al.

[11] Patent Number: 4,949,750
[45] Date of Patent: Aug. 21, 1990

[54] SURGE RELIEVER RELIEF VALVE

[75] Inventors: Donald W. Goodwin, Richardson, Tex.; Kenneth S. Adamson, Penn Valley, Calif.

[73] Assignee: Peerless Manufacturing Company, Dallas, Tex.

[21] Appl. No.: 264,220

[22] Filed: Oct. 28, 1988

[51] Int. Cl.⁵ .................. F16K 17/18; F16K 47/02
[52] U.S. Cl. .................. 137/510; 137/493.8; 137/859; 137/906; 251/118
[58] Field of Search ............... 137/493.8, 512.15, 859, 137/510, 906; 251/61.1, 118

[56] References Cited

U.S. PATENT DOCUMENTS

| | | | |
|---|---|---|---|
| Re. 19,151 | 5/1934 | Saunders | 251/331 |
| 2,630,874 | 3/1953 | Landgon | 137/859 X |
| 2,877,791 | 3/1959 | Rich | 137/487 |
| 2,895,505 | 7/1959 | Bachus | 137/859 X |
| 2,993,559 | 7/1961 | Everett | 181/53 |
| 3,083,943 | 4/1963 | Stewart et al. | 251/61.1 |
| 3,137,316 | 6/1964 | Everett et al. | 138/26 |
| 3,470,979 | 10/1969 | Everett | 181/56 |
| 3,628,573 | 12/1971 | Loliger | 138/30 |
| 3,698,416 | 10/1972 | Kwok | 137/119 |
| 4,186,776 | 2/1980 | Burton | 138/30 |
| 4,284,260 | 8/1981 | Baranoff | 251/61.1 X |
| 4,299,253 | 11/1981 | Burton | 138/30 |
| 4,427,029 | 1/1984 | Charney | 138/30 |
| 4,570,745 | 2/1986 | Sparks | 181/228 |
| 4,638,838 | 1/1987 | Richard | 138/30 |
| 4,732,175 | 3/1988 | Pareja | 138/30 |

OTHER PUBLICATIONS

Singer, American Meter Division General Products Catalog.
Grove Flexflo Regulators, Bullet No. 800-R10.
"Acoustical Analyses Solve Vibration, Failures", from Oil & Gas Journal, Aug. 11, 1986.

Primary Examiner—Stephen M. Hepperle
Attorney, Agent, or Firm—Richards, Harris, Medlock & Andrews

[57] ABSTRACT

A surge reliever relief valve is provided in which a flexible membrane is maintained in a peripherally sealed relationship across a rigid grid. The grid bounds the laterally adjacent intake and output regions of the valve. Intake pressure extends the membrane allowing flow between intake and output. Extension of the membrane is limited by a retainer. Extension may be elastic or inelastic.

8 Claims, 3 Drawing Sheets

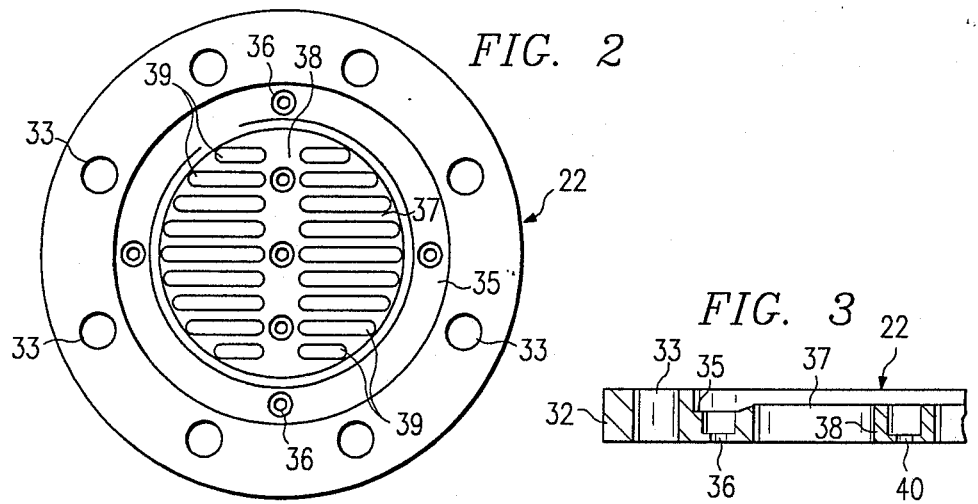
FIG. 2
FIG. 3
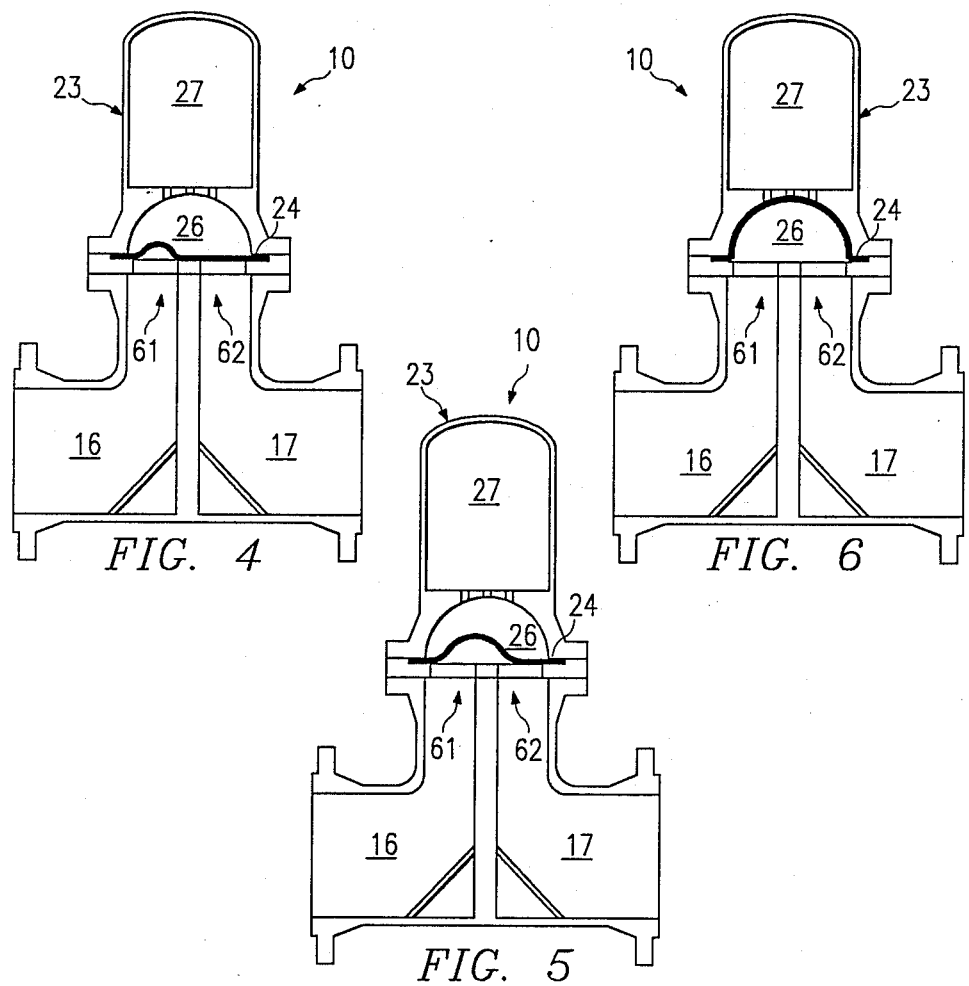
FIG. 4
FIG. 5
FIG. 6

SURGE RELIEVER RELIEF VALVE

FIELD OF THE INVENTION

This invention pertains to liquid surge relief valves and more particularly to a relief valve having a peripherally supported membrane-like seal interposed between a rigid grid plate and a retainer.

BACKGROUND OF THE INVENTION

Pressure surges or water hammer phenomena are caused by liquid deceleration or flow variations in pipes. The resulting destructive energy can cause ruptures in piping and piping components, pipe vibrations and noise. Surge arresters or relief valves, if properly used, provide relief to increases in fluid pressure associated with unsteady flow conditions. While other relief means or desurgers are known, the present invention is designed to operate reliably and economically.

SUMMARY OF THE INVENTION

The benefits and improvements of the present invention are provided by a valve having separate laterally adjacent intake and output regions bounded by a grid and sealable from one another by a membrane supported by the grid. The membrane is interposed between the grid and a retainer which defines the arched interior of a flow chamber. Pressure surges deflect or distend the membrane against pressure communicated from a pressure chamber to the flow chamber.

BRIEF DESCRIPTION OF THE DRAWINGS

FIG. 2 shows in plan view the grid plate utilized in the valve of FIG. 1;

FIG. 3 shows the grid plate of FIG. 2 in cross section;

FIGS. 4-6 show in sequential schematic diagrams, the operation of the valve illustrated in FIG. 1;

DETAILED DESCRIPTION

Figure 1:
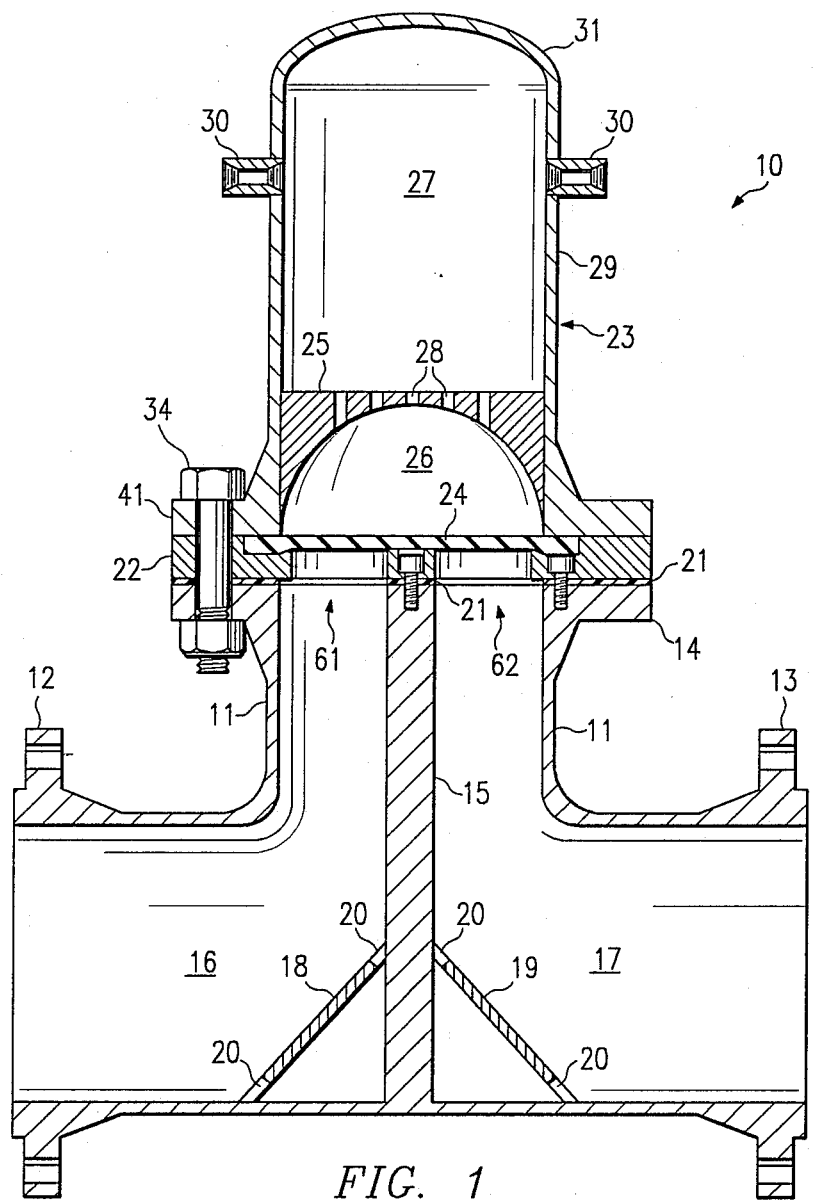
FIG. 1 shows in cross section, a surge relief valve of the present invention.
Figure 7:
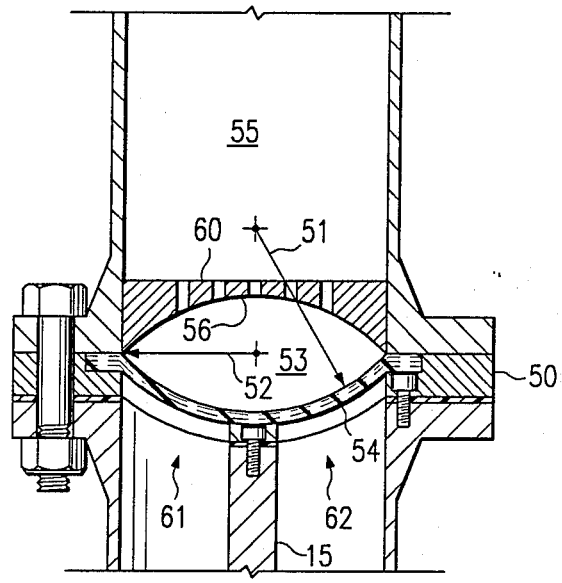
FIG. 7 shows another embodiment of the relief valve of the present invention.

As shown in FIG. 1, the surge reliever relief valve 10 of the present invention comprises a "T" shaped section of pipe 11 defining a valve body having an intake flange 12, an output flange 13 and a third flange 14, onto which the mechanically active components of the invention are mounted. The "T" section or valve body 11 further includes a barrier 15 which transects the valve body and separates the intake portion 16 from the output portion 17 of the valve. The intake region 16 includes an effluent end 61 where fluid flow traverses the opening defined by the third flange. The output region 17 includes an affluent end 62 where fluid enters the region 17 from the opening defined by the third flange. Together, the affluent of the output and effluent end of the intake comprise a divided or transected opening. It should be understood that in operation, the valve described herein is functionally symmetrical and that the intake and output designations used herein are made for convenience, and may be determined by the direction of flow. Deflectors 18, 19 are positioned within the intake and output portions to improve the efficiency of flow. Through passages 20 are provided around the edges of the deflectors so that a pressure differential across the deflector is prevented.

The third flange 14 supports a gasket 21, a grid (in this instance a grid plate) 22 and the flange 41 of a cap 23. A flat elastomeric membrane 24 is interposed between the grid and the cap flange. The cap 23 is divided by an arched retainer 25 into a flow chamber 26 and a pressure chamber 27. The pressure chamber includes upstanding side walls 29, one ore more pressure ports 30 and a dome 31. Vents 28 extend between the pressure chamber and the flow chamber allowing pressure in the chamber to bear on the membrane. In this instance, the retainer 25 and flat grid plate 22 define a hemispherical flow region 26.

As illustrated in FIGS. 2 and 3, the grid plate 22 may comprise a peripheral flange 32 having a pattern of bolt holes 33 which accommodate the fasteners 34 which attach the cap 23 to the third flange 14 of the "T" 11. In the alternative, the grid can be incorporated integrally into the valve body, as by welding. A recessed landing 35 accommodates the membrane 24 and bears a second pattern for bolt holes 36 which are used in the securing of the grid 22 to the third flange 14. A central portion of the grid includes a series of ribs 37 extending from a central pier 38 to the landing area 35, thus defining laterally adjacent input and output matrices, each having through passages 39. The central pier 38 has bolt holes 40 which are used to affix the pier to the barrier 15 in the valve body. Thus, passages 39 in the intake matrix cover and accept flow from the intake effluent, while passages in the output matrix admit flow to the output affluent.

When assembled, as seen in FIG. 1, the grid 22 is sandwiched between the cap flange 41 and the third flange 14. The gasket 21 seals between the grid and the flange 14. The elastomeric membrane 24 seals between the cap flange 41 and the grid 22. The membrane 24 is sealed about its periphery or circumference by the clamping action of the flanges 41, 14. The membrane is said to cover the opening to the flow chamber.

Thus, it can be appreciated that when the cap 23 is pressurized with dry air or nitrogen through the ports 30, that the membrane 24 acts as a closure which resists the flow of liquid in the valve from the intake section 16 to the output section 17. Generally, a fixed pressure of at least 10 p.s.i. in excess of line pressure is maintained in the pressure chamber. However, the pressure in the pressure chamber may be modulated in accordance with variations in line pressure which are not considered surges. As shown in FIGS. 4, 5 and 6, when the pressure of fluid in the intake section 16 exceeds the pressure in the cap 23 the membrane 24 will expand or extend, gradually increasing the effective volume of the intake 16 by allowing fluid to expand into the opening of the flow chamber 26 (FIG. 4), eventually communicating the intake 16 and output 17 (FIG. 5), and finally allowing full flow between intake 16 and output 17 (FIG. 6). As shown in FIG. 6, in the fully extended position, the membrane is in full contact with the retainer and is prevented from further expansion by the generally hemispherical retainer 25.

A second embodiment of the invention is illustrated in FIGS. 7-10. This embodiment of the invention is well suited to higher pressure applications because the sealing membrane is inelastic, i.e., not extensible to any appreciable degree. Rather than a flat grid plate, a grid 50 having a gentle curvature is provided. The curvature of the arched retainer 60 is similar to that of the grid.

The radius 51 of the curvature of the grid is preferably greater than the radius 52 of the divided opening. Thus, the similar curvatures of the grid 50 and arched retainer 56 define a lenticular flow chamber 53. Rather than a flat extensible membrane, a reinforced polymeric membrane 54 is provided, whose rest shape matches the curvature of the grid 50. The reinforcement of the polymeric membrane can be by way of loosely woven nylon or rayon cloth that renders the membrane flexible but inelastic.

Figure 8:
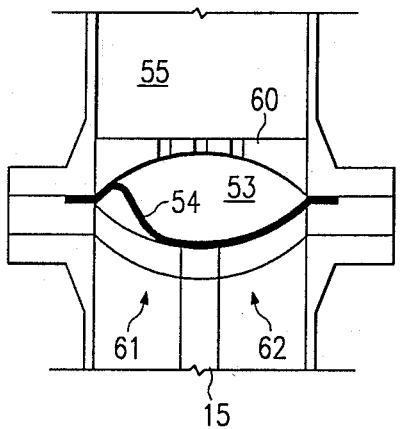
FIGS. 8-10 show in sequential schematic diagrams, the operation of the valve illustrated in FIG. 7.
Figure 9:
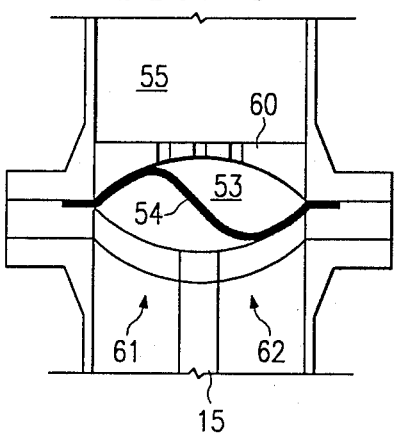
Figure 10:
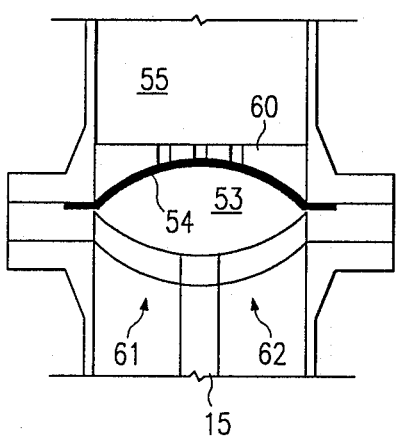

Under fluid pressure which exceeds the relief pressure in the cap 55, the reinforced membrane rolls or folds, as shown in FIG. 8. Membrane stretching in this instance is minimal. Continued membrane deflection admits partial flow into the output affluent as shown in FIG. 9, eventually contacting the retainer in full as shown in FIG. 10. The curvature of the arched portion 56 of the cap matches the curvature of the grid 50, so that even in the full flow position, as shown in FIG. 10, the membrane 54 is not significantly deformed.

While the principles of the instant disclosure are provided by way of specific examples, it will be understood that these examples should not operate as limitations to the scope of the invention as set forth in the following claims.

Accordingly what is claimed is:

1. An improved surge relief valve, comprising:
   a grid having a periphery, a central portion and a pier which bisects the central portion, the pier separating two laterally adjacent matrices of through passages, the matrices defining an intake matrix and an output matrix;
   a liquid flow intake section having an effluent end bounded by the intake matrix of the grid;
   a liquid flow output section having an effluent end bounded by the output matrix of the grid;
   the affluent and effluent ends forming an opening bisected by a barrier;
   the grid interposed between the bisected opening and a membrane;
   the membrane in sealing contact with the periphery of the grid and covering an opening to a flow chamber having an arched retainer;
   the retainer having one or more vents formed therein, the vents leading into a pressure chamber; and
   the membrane being an extensible elastomeric element having a rest position in sealing contact with the central portion of the grid and adapted to deform, under the influence of an increasing intake fluid pressure to an extended position in which the membrane is in full contact with the retainer, the grid being flat.

2. An improved surge relief valve comprising:
   a valve body having an intake region and laterally adjacent output region, the intake and output regions transected by a barrier;
   the intake and output regions forming an opening divided by the barrier;
   the opening bounded by a grid, the grid having a periphery and a central portion having formed therein an intake matrix and a laterally adjacent output matrix, the matrices divided by a pier, each matrix comprising a plurality of through passages, the passages leading from the transected opening to a flow chamber defined by the grid and an arched retainer; a membrane having a rest position in which it is in sealing contact with the periphery of the grid; the membrane interposed between a grid and the retainer; the retainer having vents formed therein; the vents leading into a pressure chamber; and the grid being flat.

3. The improved surge relief valve of claim 2, wherein:
   the membrane is elastic and is flat in the rest position.

4. An improved surge relief valve, comprising:
   a valve body having an intake region, an output region and a portion defining a cylindrical opening;
   a barrier mounted in the valve body to separate the intake region from the output region within the valve body, the barrier extending to an end at the opening and bisecting the opening to define an effluent end and an affluent end;
   a grid plate mounted to the valve body over the opening, the grid plate having a recessed landing and a central portion, the central portion having a center pier extending along the end of the barrier and a plurality of ribs extending between the pier and recessed landing to define a first set of passages over the effluent end and a second set of passages over the affluent end;
   a membrane sealed to the recessed landing of the grip plate about the central portion and covering the passages in its rest position to isolate the effluent and affluent ends;
   a cap defining a pressure chamber and a flow chamber, the cap including an arches retainer to restrict deflection of the membrane into the flow chamber.

5. The improved surge relief valve of claim 4 wherein the pier is provided with at least one bolt hole and the end of the barrier is provided with a mating threaded opening for securing the grid plate to the valve body.

6. The improved surge relief valve of claim 4 wherein the central portion has a concave shape of radius greater than the radius of the opening.

7. The improved surge relief valve of claim 4 further having deflectors mounted in the intake region and the output region between the valve body and the barrier to improve flow efficiently, the deflectors each having a passage therethrough to prevent a pressure differential buildup on opposite sides of the barrier.

8. The improved surge relief valve of claim 4 wherein the valve body is a Tee, the barrier bisecting the Tee.

* * * * *